(12) United States Patent
Sun et al.

(10) Patent No.: US 6,192,080 B1
(45) Date of Patent: Feb. 20, 2001

(54) MOTION COMPENSATED DIGITAL VIDEO SIGNAL PROCESSING

(75) Inventors: Huifang Sun, Cranbury, NJ (US); Anthony Vetro, Staten Island, NY (US); Yen-Kuang Chen, Franklin Park; Sun-Yuan Kung, Princeton, both of NJ (US)

(73) Assignee: Mitsubishi Electric Research Laboratories, Inc., Cambridge, MA (US)

( * ) Notice: Under 35 U.S.C. 154(b), the term of this patent shall be extended for 0 days.

(21) Appl. No.: 09/206,032

(22) Filed: Dec. 4, 1998

(51) Int. Cl.[7] .............................. H04N 7/12; H04B 1/66
(52) U.S. Cl. .................................. 375/240.16; 348/404.1
(58) Field of Search ............................ 348/404.1, 405.1, 348/409.1, 415.1, 416.1, 419.1; 382/232, 234, 236, 238, 240; 375/240, 240.01, 240.02, 240.11, 240.15, 240.16; H04N 7/12, 11/04; H04B 1/66

(56) References Cited

U.S. PATENT DOCUMENTS

| | | | |
|---|---|---|---|
| 4,383,272 | 5/1983 | Netravali et al. | 358/136 |
| 5,361,104 | * 11/1994 | Ohki | 348/699 |
| 5,526,054 | * 6/1996 | Greenfield et al. | 348/467 |
| 5,598,226 | * 1/1997 | Kokaram | 348/607 |
| 5,764,293 | * 7/1998 | Uz et al. | 348/390 |
| 5,969,764 | * 10/1999 | Sun et al. | 348/404 |

FOREIGN PATENT DOCUMENTS

1006732 * 11/1999 (EP) ............................. H04N/7/46

* cited by examiner

*Primary Examiner*—Chris S. Kelley
*Assistant Examiner*—Tung Vo
(74) *Attorney, Agent, or Firm*—Dirk Brinkman

(57) ABSTRACT

A method determines true motion vectors associated with a sequence of images. The images include fields made up of blocks of pixels. The method selects candidate feature blocks from the blocks of pixels. The candidate feature blocks have intensity variances above a threshold indicative of texture features. Candidate feature blocks in similarly numbered adjacent field intervals are compared to determine sets of displaced frame differences parameters for each candidate feature block. The true motion vectors for each candidate feature block are determined from a minimum weighted score derived from the difference parameters.

14 Claims, 6 Drawing Sheets

MOTION COMPENSATED DIGITAL VIDEO SIGNAL PROCESSING

RELATED APPLICATION/PATENTS

In an earlier filed U.S. Application Ser. No. 08/800,880, entitled "Adaptive Video Coding Method," filed in the name of Huifang Sun and Anthony Vetro, now U.S. Pat. No. 5,790,196, a system was disclosed for coding video signals for storage and/or transmission using joint rate control for multiple video objects based on a quadratic rate distortion model.

In a second application, Ser. No. 08/896,861, entitled "Improved Adaptive Video Coding Method," Sun and Vetro described an improved method of target distribution and introduction of a tool to take into account object shape in the rate control process. The disclosures of these previously-filed applications are incorporated by reference in the present application, particularly insofar as they describe the general configurations of encoding and decoding, including motion estimation and motion compensation functions in such systems.

BACKGROUND OF THE INVENTION

For an overall understanding of general techniques involved in encoding and decoding video image information, reference should be made to the "MPEG-4 Video Verification Model Version 5.0", prepared for the International Organization for Standardization by the Ad hoc group on MPEG-4 video VM editing, paper Number MPEG 96/N1469, November 1996, the contents of which are herein incorporated by reference.

This invention relates to encoding and decoding of complex video image information including motion components which may be encountered, for example, in multimedia applications, such as video-conferencing, video-phone, and video games. In order to be able to transfer complex video information from one machine to another, it is often desirable or even necessary to employ video compression techniques. One significant approach to achieving a high compression ratio is to remove the temporal and spatial redundancy which is present in a video sequence. To remove spatial redundancy, an image can be divided into disjoint blocks of equal size. These blocks are then subjected to a transformation (e.g., Discrete Cosine Transformation or DCT), which decorrelates the data so that it is represented as discrete frequency components. With this representation, the block energy is more compact, hence the coding of each block can be more efficient. Furthermore, to achieve the actual compression, two-dimensional block elements are quantized. At this point, known run-length and Huffman coding schemes can be applied to convert the quantized data into a bit-stream. If the above process is applied to one block independent of any other block, the block is said to be intra-coded. On the other hand, if the block uses information from another block at a different time, then the block is said to be inter-coded. Inter-coding techniques are used to remove temporal redundancy. The basic approach is that a residual block (or error block) is determined based on the difference between the current block and a block in a reference picture. A vector between these two blocks is then determined and is designated as a motion vector. To keep the energy in the residual block as small as possible, block-matching algorithms (BMAs) are used to determine the block in the reference picture with the greatest correlation to the current block. With the reference block locally available, the current block is reconstructed using the motion vector and the residual block.

For the most part, video coding schemes encode each motion vector differentially with respect to its neighbors. The present inventors have observed that a piecewise continuous motion field can reduce the bit rate in this case. Hence, a rate-optimized motion estimation algorithm has been developed. The unique features of this proposal come from two elements: (1) the number of bits used for encoding motion vectors is incorporated into the minimization criterion, and (2) rather than counting the actual number of bits for motion vectors, the number of motion vector bits is estimated using the residues of the neighboring blocks. With these techniques, the bit-rate is lower than in prior encoders using full-search motion-estimation algorithms. In addition, the computational complexity is much lower than in a method in which rate-distortion is optimized. The resulting motion field is a true motion field, hence the subjective image quality is improved as well.

If we disregard for a moment the advantages that are achieved in terms of coding quality and bit rate savings, and only concentrate on the improvements in subjective image quality, it can be demonstrated that the resulting true motion field can be used at the decoder, as well, in a variety of other ways. More specifically, it has been found that the true motion field can be used to reconstruct missing data, where the data may be a missing frame and/or a missing field. In terms of applications, this translates into frame-rate up-conversion, error concealment and interlaced-to-progressive scan rate conversion capabilities, making use of the true motion information at the decoder end of the system.

Frame-Rate Up-Conversion. The use of frame-rate up-conversion has drawn considerable attention in recent years. To accomplish acceptable coding results at very low bit-rates, most encoders reduce the temporal resolution, i.e., instead of targeting the full frame rate of 30 frames/sec (fps), the frame rate may be reduced to 10 fps, which would mean that 2 out of every 3 frames are never even considered by the encoder. However, to display the full frame rate at the decoder, a recovery mechanism is needed. The simplest mechanism is to repeat each frame until a new one is received. The problem with that interpolation scheme is that the image sequence will appear very discontinuous or jerky, especially in areas where large or complex motion occurs. Another simple mechanism is linear-interpolation between coded frames. The problem with this mechanism is that the image sequence will appear blurry in areas of motion, resulting in what is referred to as ghost artifacts.

From the above, it appears that motion is the major obstacle to image recovery in this manner. This fact has been observed by a number of prior researchers and it has been shown that motion-compensated interpolation can provide better results. In one approach, up-sampling results are presented using decoded frames at low bit-rates. However, the receiver must perform a separate motion estimation just for the interpolation. In a second approach, an algorithm that considers multiple motion is proposed. However, this method assumes that a uniform translational motion exists between two successive frames. In still a third approach, a motion-compensated interpolation scheme is performed, based on an object-based interpretation of the video. The main advantage of the latter scheme is that the decoded motion and segmentation information is used without refinement. This may be attributed to the fact that the object-based representation is true in the "real" world. However, a proprietary codec used in that approach is not readily available to all users.

The method proposed in the present case is applicable to most video coding standards in that it does not require any proprietary information to be transmitted and it does not require an extra motion estimation computation. The present motion-compensated interpolation scheme utilizes the decoded motion information which is used for inter-coding. Since the current true motion estimation process provides a more accurate representation of the motion within a scene, it becomes possible to more readily reconstruct information at the decoder which needs to be recovered before display. Besides quality, the major advantage of this method over other motion compensated interpolation methods is that significantly less computation is required on the decoder side.

Error Concealment. True motion vector information can also be employed to provide improved error concealment. In particular, post-processing operations at the decoder can be employed to recover damaged or lost video areas based on characteristics of images and video signals.

Interlaced-to-Progressive Scan Conversion. In addition to the above motion-compensated interpolation method, a related method for performing interlaced-to-progressive scan conversion also becomes available. In this scenario, rather than recovering an entire frame, an entire field is recovered. This type of conversion is necessary for cases in which a progressive display is intended to display compressed inter-frame, and motion-compensated inter-frame.

Intraframe methods. Simple intraframe techniques interpolate a missing line on the basis of two scanned lines which occur immediately before and after the missing line. One simple example is the "line averaging" which replaces a missing line by averaging the two lines adjacent to it. Some other improved intraframe methods which use more complicated filters or edge information have been proposed by M. H. Lee et al. (See "A New Algorithm for Interlaced to Progressive Scan Conversion Based on Directional Correlations and its IC Design," IEEE Transactions on Consumer Electronics, Vol. 40, No. 2, pp. 119–129, May 1994). However, such intraframe techniques cannot predict information which is lost from the current field, but which appears in neighboring fields.

Interframe techniques take into account the pixels in the previous frame in the interpolation procedure. One simple and widely-adopted method is the field staying scheme which lets $I(m,2n+((t-1) \mod 2),t)=I(m,2n+((t-1) \mod 2), t-1)$. Non-motion-compensated approaches, which apply linear or nonlinear filters, are fine for stationary objects, but they result in severe artifacts for moving objects.

For moving objects, it has been found that motion compensation should be used in order to achieve higher quality. Some motion compensated de-interlacing techniques have been proposed. For example, it has been shown that motion compensated de-interlacing methods are better than the intraframe methods and non-motion-compensated interframe methods (see Lee et al., "Video Format Conversions between HDTV Systems," IEEE Transactions on Consumer Electronics, Vol. 39, No. 3, pp. 219–224, August. 1993).

The system disclosed by the present inventors utilizes an accurate motion estimation/compensation algorithm so it is classified as a motion-compensated interframe method. The interlaced-to-progressive scan conversion procedure contains two parts: (1) a motion-based compensation, and (2) a generalized sampling theorem. The motion-based compensation essentially determines a set of samples at a time 2t, given samples at 2t−1 and 2t+1. In general, these determined sets of samples will not lie on the image grid at time 2t, since the motion vector between 2t−1 and 2t+1 is arbitrary. Therefore, a generalized sampling theorem is used to compute the missing samples at the grid points given the motion compensated samples and the samples which already exist. Formally, this can be expressed as: first, find $\{I(m+\Delta_x,2n+\Delta_y,2t)\}$ given $\{I(m,2n-1,2t-1)\}$ and $\{I(m,2n+1,2t+1)\}$, then find $\{I(m,2n+1,2t)\}$ given $\{I(m,2n,2t)\}$ and $\{I(m+\Delta_x,2n+\Delta_y,2t)\}$.

While the invention will be described hereinafter in terms of a preferred embodiment and one or more preferred applications, it will be understood by persons skilled in this art that various modifications may be made without departing from the actual scope of this invention, which is described hereinafter with reference to the drawing.

In accordance with a further aspect of the present invention, a method of image data interpolation comprises decoding true motion vector data associated with blocks of digitally encoded image information, with the true motion vector data being dependent in part on neighboring image block proximity weighting factors. The method further comprises interpolating from the supplied picture information, image sequence signal data corresponding to intermediate image time intervals absent from the supplied picture information, the absent image time intervals corresponding to intermediate image information occurring during the intermediate image time intervals in sequence between supplied image time intervals associated with the supplied picture information. The interpolation comprises the steps of constructing image pixels for image blocks in each intermediate image time interval, based upon corresponding pixels in corresponding blocks in the supplied picture information which occur immediately before and after the intermediate image time interval, by distributing to constructed image pixels a fractional portion of image intensity difference information between the corresponding pixels occurring before and after the intermediate time to produce averaged intensity pixels for the intermediate image time interval. Thereafter, each constructed image pixel in each intermediate time interval is associated with a corresponding true motion vector equal in magnitude to a fractional part of the true motion vector information associated with the block in which the corresponding pixel is located in a reference supplied time interval, the fractional part being determined according to the number of intermediate image time intervals inserted between supplied time intervals. Each constructed, averaged intensity pixel is then associated with a spatial location in the intermediate image time interval according to the fractional part of the corresponding decoded true motion vector.

DRAWING

DETAILED DESCRIPTION

Figure 1:
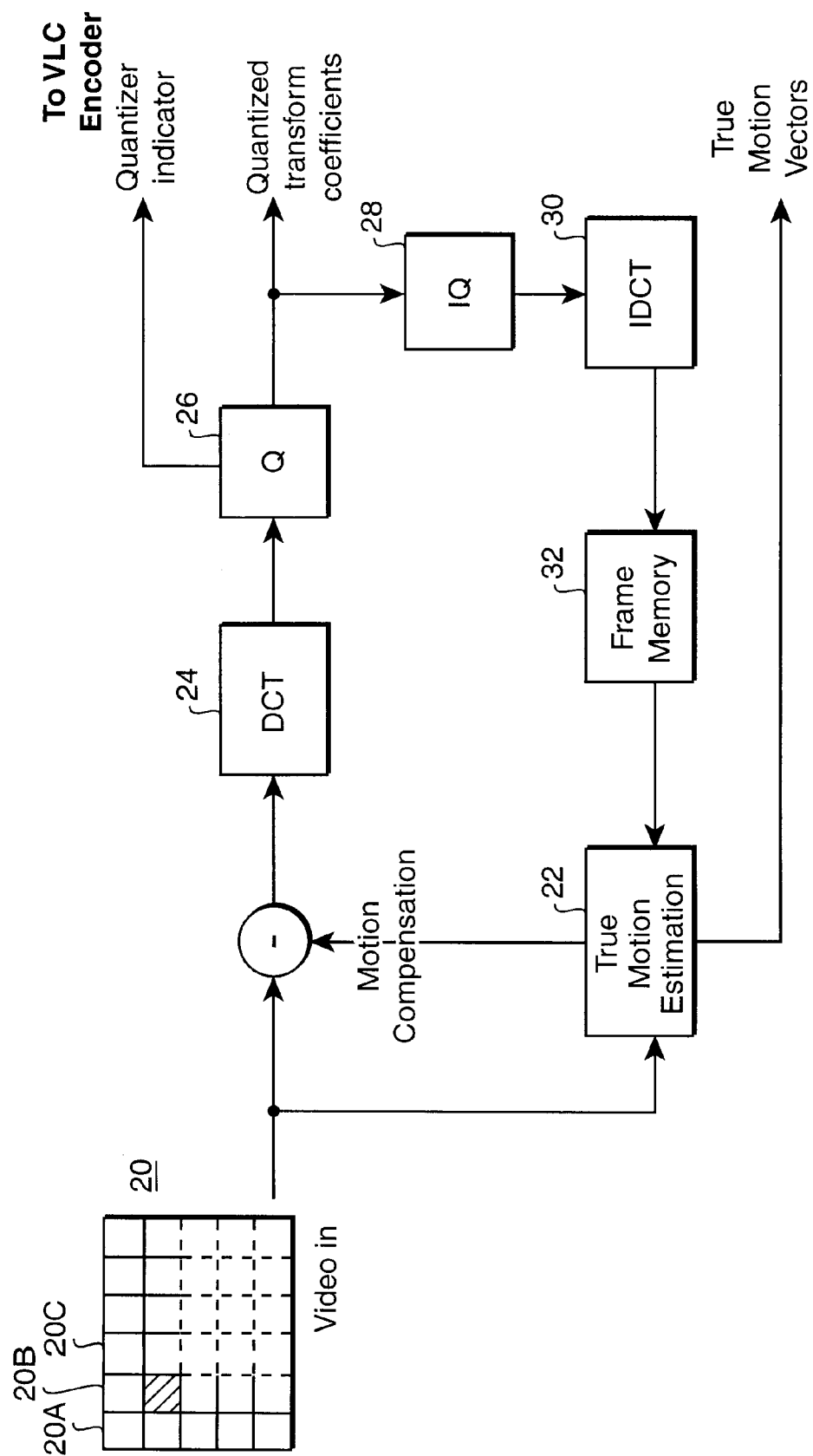
FIG. 1 is a block diagram of a portion of an encoder adapted for use in connection with the present invention.
Figure 7:
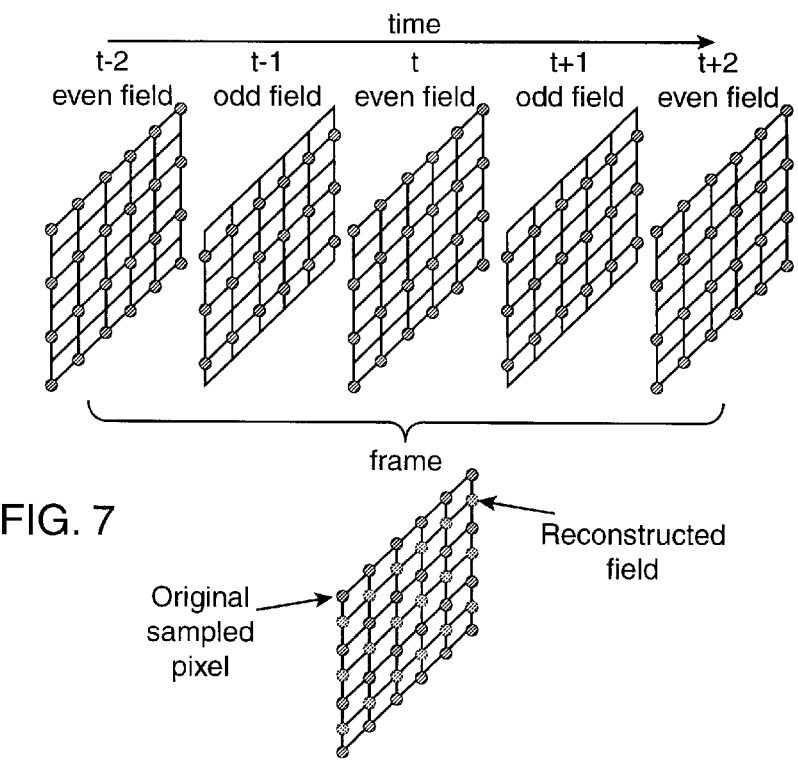
FIG. 7 is a schematic illustration which is helpful in understanding a technique for accomplishing interlaced to progressive scan conversion in a system employing the present invention.

In the video encoder shown in block diagram form in FIG. 1, a digital video signal representing a sequence of images 20, comprising spatially arranged video blocks 20A, 20B, 20C, etc., each made up of individual image pixels (or pels)—see FIG. 7—is supplied as a signal input to the video encoder. The video image information is supplied in a conventional sequence of luminance and chrominance information.

Figure 2:
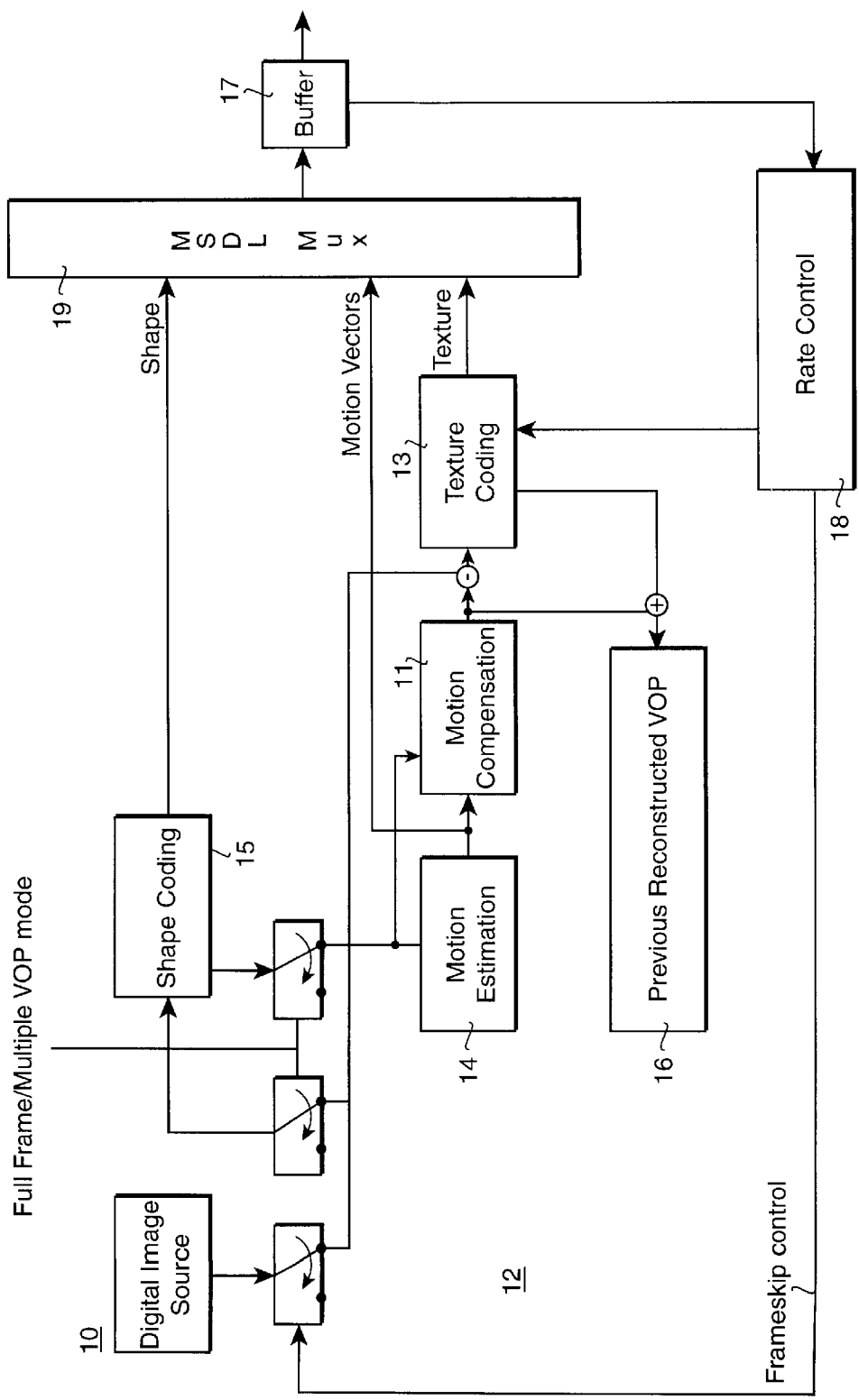
FIG. 2 is a block diagram of a portion of an encoder of the same general type as is illustrated in the above-mentioned first Sun and Vetro application.
Figure 8:
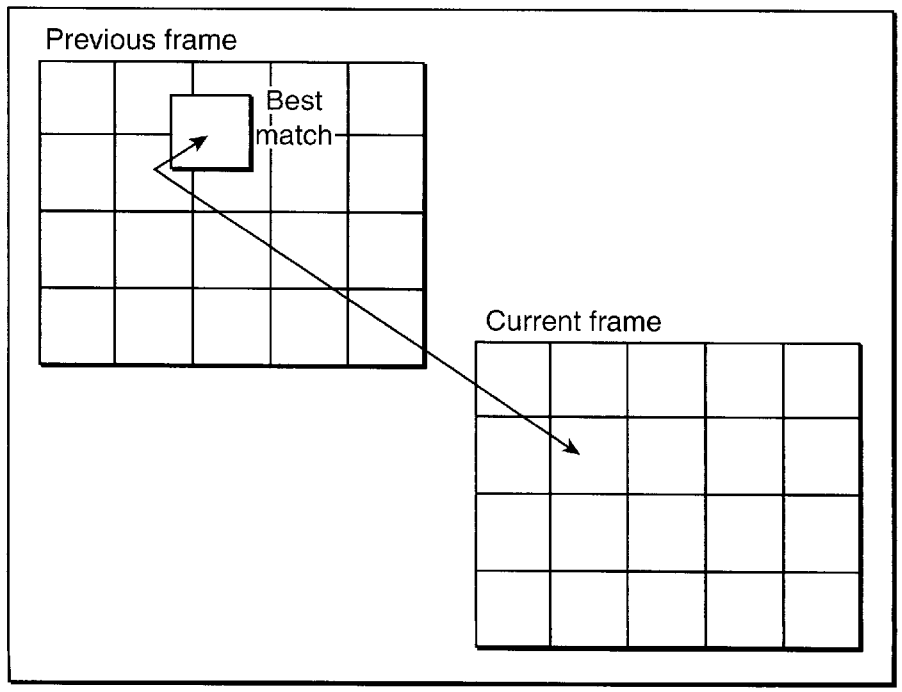
FIG. 8 is a pictorial representation helpful in understanding principals of block motion compensation.

In accordance with the present invention, as will be described more fully below, the incoming digital video signal is supplied to a true motion estimation processor 22 to determine true motion vectors TMV representative of the "best match" between, for example, a block of the current frame and a "corresponding" block of a previous frame as illustrated in FIG. 8. The processor 22 provides an appropriate motion compensated prediction for the video signal. "Difference image" information is then subjected to a Discrete Cosine Transformation (DCT) 24 and the transformed information is subjected to quantization (Q) 26, each of which operations is conventional. Quantized transform coefficients and quantizer indicator information are supplied to a variable length coding (VLC) encoder such as the general arrangement shown in FIG. 2. The quantized transform coefficients are subjected to Inverse Quantization (IQ) 28 and then to Inverse Discrete Cosine Transformation (IDCT) 30. The resulting information is coupled to a frame memory 32 to provide a delay. Image information from a current image and a frame delayed image from frame memory 32 are compared and processed, as will be explained below, to produce true motion vector information for application in accordance with the present invention at the decoder of a system (see FIG. 3). An encoder arrangement of the general type shown in FIG. 2, but not specifically directed to providing true motion vectors, is described in greater detail in the above-identified patent of Sun and Vetro, the disclosure of which is incorporated herein by reference.

Algorithms for computing motion flow can be divided into two categories; those for removing temporal redundancy and those for tracking physical motion.

Figure 5:
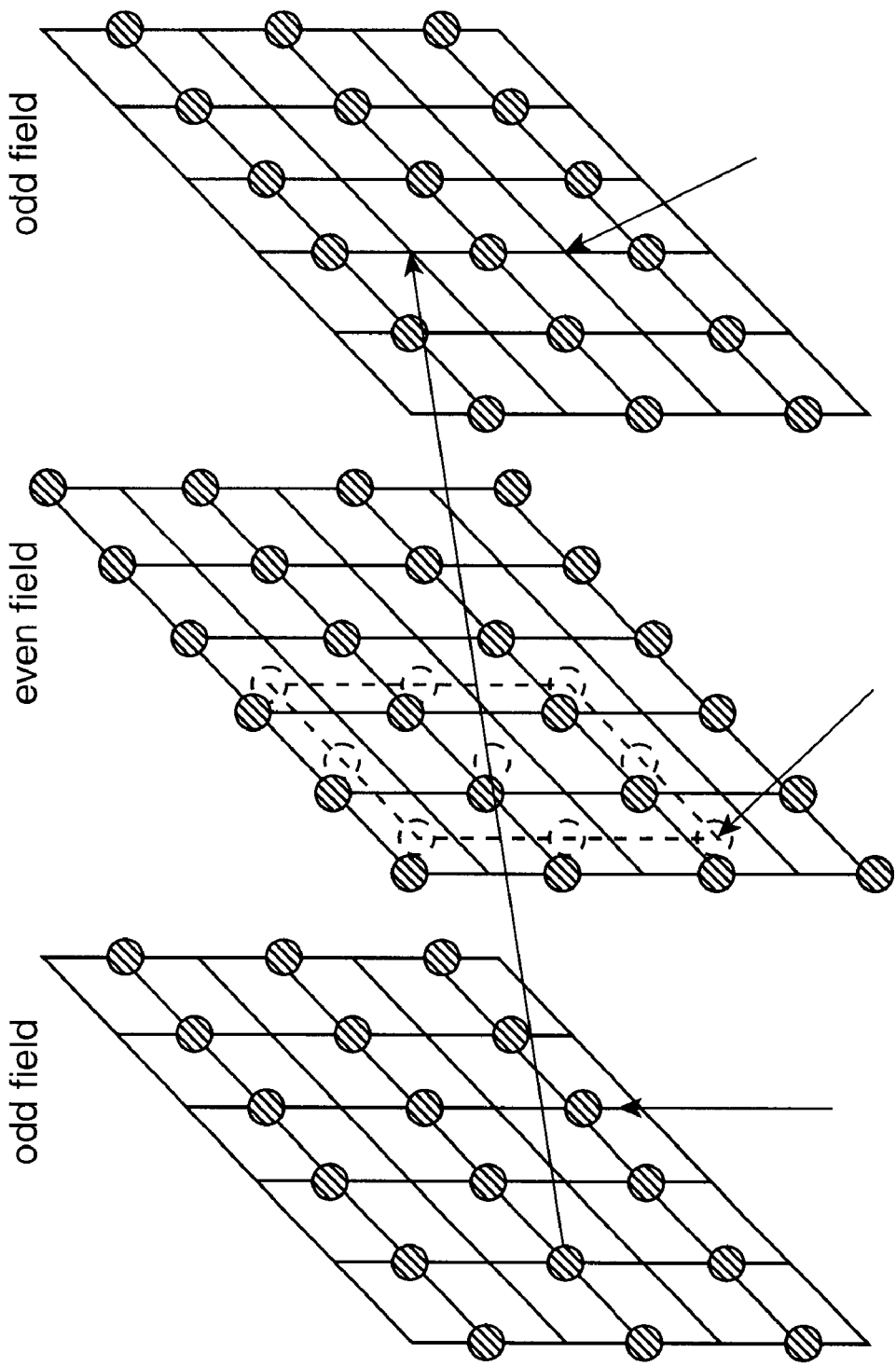
FIG. 5 is schematic illustration of certain aspects of motion interpolation as employed in a motion based de-interlacing process according the another aspect of the invention.

The first set of motion estimation algorithms is aimed at removing temporal redundancy in the video compression process. In motion pictures, similar scenes exist in a frame and a corresponding previous frame. In order to minimize the amount of information to be transmitted, the MPEG video coding standards code the displaced difference block instead of the original block. For example, assume a block in a current frame is similar to a displaced block in a previous frame. (See for example, FIG. 5 showing two odd fields and an intermediate even field in an interlaced system, with the "similar" block shown by the dashed line outline). A motion prediction vector together with a residue (difference) is coded. Since an achieved compression ratio will depend on removal of redundancy, the displacement vector corresponding to minimal displaced frame difference (DFD) is often used in prior systems.

A second type of motion estimation algorithm aims at accurately tracking the physical motion of features in video sequences. A video sequence arises from putting a three dimensional (3D) real world onto a series of 2D images. When objects in the 3D real world move, the brightness (pixel intensity) of the 2D images changes correspondingly. The 2D projection of the movement of a point in the 3D real world will be referred to herein as the "true motion." Computer vision, whose goal is to identify the unknown environment via the moving camera, is one of the many potential applications of true motion information.

Many existing motion estimation algorithms attempt to optimize the search for a suitable or best motion vector in the rate-distortion sense. Often, a complex scheme results and the motion vectors do not correspond to the true physical motion within the scene.

In most video compression algorithms, there is a tradeoff among picture quality, compression ratio and computational cost. Generally speaking, the lower the compression ratio, the better the picture quality.

In high quality video compression (e.g. video broadcasting), quantization scales are usually low. Therefore, the number of bits available for an inter frame residual block $B_{i\_res}$ is dominant with regard to the total bit rate $B_{total}$. Until recently, it was generally believed that use of a smaller displaced frame difference (DFD or mean residue) would result in fewer bits to code the residual block, and thus a smaller total bit rate. Hence, the minimal DFD criterion is still widely used in BMAs (block matching algorithms) and, the motion vector for any particular block is the displacement vector which carries the minimal DFD. That is:

$$\text{motion vector} = \arg\min_{\vec{v}}\{DFD(\vec{v})\} \quad (1)$$

However, it has been observed that full-search BMAs are computationally too costly for a practical real-time application, usually do not produce the true motion field, which could produce better subjective picture quality, and generally cannot produce the optimal bit rate for very low bit rate video coding standards.

In most video coding standards, motion vectors are differentially encoded, therefore it is not always true that a smaller DFD will result in a reduced bit rate. The reason is that the total number of bits, which includes the number of bits for interframe residues, also includes the number of bits for coding motion vectors. Conventional BMAs treat the motion estimation problem as an optimization problem on DFD only, hence they suffer from the high price of the differential coding of motion vectors with large differences. The smaller the difference, the less bits that are required. A rate-optimized motion estimation algorithm such as is shown below, should account for the total number of bits:

$$\{v_i\}_{i=1}^n = \arg\min_{\{\vec{v_i}\}}\{\text{bits}(DFD_1(\vec{v}_1), Q_1) + \text{bits}(\Delta\vec{v}_1) + \quad (2)$$
$$\text{bits}(DFD_2(\vec{v}_2), Q_2) + \text{bits}(\Delta\vec{v}_2) + \ldots +$$
$$\text{bits}(DFD_n(\vec{v}_n), Q_n) + \text{bits}(\Delta\vec{v}_n)\}$$

where $\vec{v}_i$ is the motion vector of block i, $\Delta\vec{v}_i = \vec{v}_i - \vec{v}_{i-1}$, $DFD_i(\vec{v}_i)$ represents the DFD of block i, and $\text{bits}(DFD_i(\vec{v}_i), Q_i)$ is the number of bits required for this frame difference.

Spatial Correlation Technique.

It has been found that the true motion field may be considered piecewise continuous in the spatial domain.

Therefore, the motion vectors can be more dependably estimated if the global motion trend of an entire neighborhood is considered, as opposed to that of one feature block itself. This approach enhances the chance that a singular and erroneous motion vector may be corrected by its surrounding motion vectors. For example, assume that there is an object moving in a certain direction and a tracker fails to track its central block due to noise, but successfully tracks its surrounding blocks. When a smoothness constraint is applied over the neighborhood, the true motion of the central block can be recovered.

Spatial/Temporal Correlation Technique.

The true motion field may also be considered to be piecewise continuous in the temporal domain. That is, assuming that the motion of each block is much smaller than the size of the block, then the motion field is piecewise continuous in the temporal domain. Therefore, motion fields may not only be considered to be piecewise continuous in the spatial domain (2D) but also piecewise continuous in the temporal domain (1D). The initial search area for matching thus can be reduced by exploiting correlations of motion vectors between spatial and temporal adjacent blocks.

A piecewise continuous motion field is advantageous in reducing the bit rate for differentially encoded motion vectors. Hence, a "true" motion tracker based on a neighborhood relaxation approach offers an effective approach for rate-optimized motion estimation. In the context of neighborhood relaxation, Eq. (2) can be written as:

$$\text{motion of } B_i \approx \arg\min_{\vec{v}} \left\{ \frac{\dot{\alpha}_1}{Q_i} DFD_i(\vec{v}) + \dot{\alpha}_2 \|\Delta\vec{v}\| \right\} \quad (3)$$

$$\approx \arg\min\{DFD_i(\vec{v}) + \beta\|\Delta\vec{v}\|\}.$$

where $\beta = \dot{\alpha}_2 Q_i / \dot{\alpha}_1$

The coefficients $\alpha_1$ and $\alpha_2$ are selected to provide a desired approximation for the influence of neighboring blocks on the motion vector.

Assume that $B_j$ is a neighbor of $B_i$, $\vec{v}_j$ is the optimal motion vector, and that $DFD_j(\vec{v})$ increases as $\vec{v}$ deviates from $\vec{v}^*_j$ according to $$DFD_j(\vec{v}) \approx DFD_j(\vec{v}^*_j) + \Upsilon\|\vec{v} - \vec{v}^*_j\|, \quad (4)$$

or, $$\|\Delta\vec{v}\| = \|\vec{v} - \vec{v}^*_j\| \approx \Upsilon^{-1}(DFD_j(\vec{v}) - DFD_j(\vec{v}^*_j)). \quad (5)$$

Substituting Eq. (5) into Eq. (3), $$\text{motion of } B_i \approx \arg\min_{\vec{v}} \{DFD_i(\vec{v}) + \quad (6)$$

$$\mu \sum_{B_j \in N(B_i)} (DFD_j(\vec{v}) - (DFD_j(\vec{v}^*_j)))\},$$

where $N(B_i)$ means the neighboring blocks of $B_i$. ($\mu=\beta/\gamma=\alpha_2 Q$ Ĺ$/\gamma\alpha_1$) Here we can use an idea commonly adopted in relaxation methods, i.e., we can let $\vec{v}_j^*$ (and $DFD_j(\vec{v}_j)^*$) remain constant during the block Ĺ updating of the neighborhood relaxation. Therefore, they can be dropped from Eq. (7), resulting in $$\text{motion of } B_i = \arg\min_{\vec{v}}\{DFD_i(\vec{v}) + \mu \sum_{B_j \in N(B_i)} (DFD_j(\vec{v}))\} \quad (8)$$

If a particular motion vector results in the DFDs of the center block and its neighbors dropping, then it is selected to be the motion vector for that block for the encoder. That is, when two motion vectors produce similar DFDs, the one that is much closer to the neighbors, motion will be selected. The motion field produced by this method will be smoother than that of Eq. (1).

The above approach will be inadequate for non-translational motion, such as object rotation, zooming, and approaching. For example, assume an object is rotating counterclockwise. Because Eq. (8) assumes the neighboring blocks will move with the same translational motion, it may not adequately model the rotational motion. Since the neighboring blocks may not have uniform motion vectors, a further relaxation on the neighboring motion vectors is introduced; that is $$\text{motion of } B_i = \arg\min\{DFD(B_i, \vec{v}) + \quad (9)$$

$$\sum_{B_j \in N(B_i)} (\mu_{i,j} \times DFD(B_j, \vec{v} + \vec{\delta}))\}$$

where a small $\delta$ is incorporated to allow local variations of motion vectors among neighboring blocks due to the non-translational motions, and $\mu_{i,j}$ is the weighting factor for different neighboring blocks. The shorter the distance between $B_i$ and $B_j$, the larger will be $\mu_{i,j}$. Also, the larger the $Q_i$, the larger the $\mu_{i,j}$. In particular, we use the 4 nearest neighbors with higher weighting for DFD's closer to the center. The inclusion of the $\vec{\delta}$ vector allows reasonable tracking of more complex motion such as rotation, zooming, shearing, and the like. Neighborhood relaxation will consider the global trend in object motion as well as provide some flexibility to accommodate non-translational motion. Local variations $\delta$ among neighboring blocks of Eq. (9), are included in order to accommodate those other (i.e., non-translational) affine motions such as (a) rotation, and (b) zooming/approaching.

Figure 3:
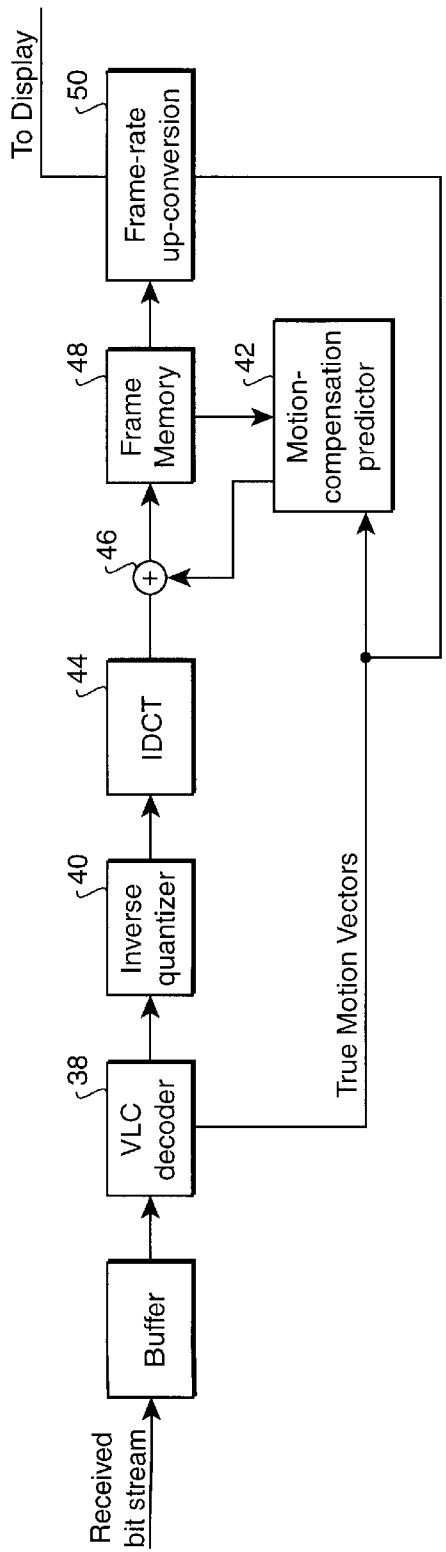
FIG. 3 is a block diagram of a portion of a video decoder adapted for use in connection with the present invention.

Referring to FIG. 3, at the decoding end of the system, a received signal bitstream is provided to a Variable Length (VLC) Decoder 38 and the output of Decoder 38 is coupled to an Inverse Quantizer (IQ) 40. The True Motion Vector (TMV) information provided by the encoder (FIG. 1) in accordance with the present invention is extracted and is supplied to motion compensation predictor 42. The main signal output of VLD 38/IQ 40 is subjected to Inverse Discrete Cosine Transformation (IDCT) 44 and is combined at adder 46 with an output from motion compensation block 42. The combined output from adder 46 is supplied to a frame memory 48, the output of which is supplied to remaining post processing stages of the information processing receiver for post-processing to produce a desired image on a display. The True Motion Vector information available at the decoder is also supplied to the post-processing stage 50 to accomplish, for example, a desired frame rate up-conversion or interlaced to progressive scan as explained below.

Frame-Rate Up-Conversion

Figure 4:
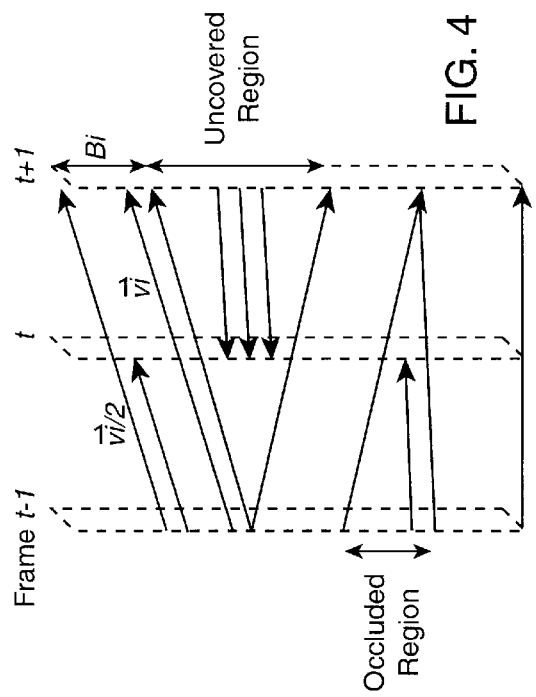
FIG. 4 is an illustration which is helpful in understanding terminology used in connection with the frame-rate up-conversion process, using transmitted motion information in accordance with one aspect of the present invention.

Referring to the schematic diagram of FIG. 4 of the drawing, if image block $B_i$ moves $v_i$ from frame $F_{t-1}$ to frame $F_{t+}$, then it is likely that block $B_i$ moves $v_i/2$ from frame $F_{t-1}$ to frame $F_t$ i.e., as depicted in FIG. 4. The basic technique of motion-based frame-rate up-conversion is to interpolate frame $F_t$ based on frame $F_{t-1}$, frame $F_{t+1}$, and block motion vectors $\{v_i\}$ can be stated as follows:

$$\tilde{I}\left(\vec{p} - \frac{\vec{v}_i}{2}, t\right) = \frac{1}{2}\{I(\vec{p} - \vec{v}_i, t-1) + I(\vec{p}, t+1)\} \forall \ \vec{p} \in B_i \quad (10)$$

where $\vec{p} = [x,y]^9$ indicates the pixel location, $I(p, \vec{t})$ means the intensity of the pixel [x,y] at time t, and $\tilde{I}(\vec{p}, t)$ means the reconstructed intensity of the pixel [x,y] at time t and $v_i$ is the motion vector of block $B_i$.

Note that the more accurate the motion estimation, $v_i/2$, the smaller the reconstruction error, $\Sigma\|I(p,t)-\tilde{I}(p,t)\|$, and the higher the quality of the motion based interpolation. Therefore, one possible technique of frame-rate up-conversion using transmitted motion is to encode $F_{t-1}$, $F_{t+1}$, ... with $\{2v_i\}$ where $v_i$ is the motion vector of $B_i$ from $F_t$ to $F_{t+1}$. The reconstruction error will be minimized, but the rate-distortion curves may not be optimized.

We can show that Eq. (9) captures the true movement of the block in the scene more accurately than Eq. (1) does. Hence, it is most likely that $v_i/2$ using Eq. (9) is more accurate than $v_i/2$ using Eq. (1).

When a block $B_i$ is coded as the INTRA block (no motion compensation), it usually implies an uncovered region (see FIG. 4). Hence, $$\tilde{I}(p,t) = \tilde{I}(p,t+1) \forall p \in B_i \quad (11)$$

When $I(p,t)$ has never been assigned to any value by Eq. (10) and Eq. (11), it usually implies an occluded region. As a result, $$\tilde{I}(p,t) \ \tilde{I}(p,t-1) \quad (12)$$

For the more general problem of interpolating from $F_{t+n}$ our method can be summarized as follows:

$$I(\vec{p}, t) = \sum_{\{B_i\}} w\left(\vec{p}, \vec{p}_i + \frac{n\vec{v}_i}{m+n}\right)\left(I\left(\vec{p} - \frac{m\vec{v}_i}{m+n}, t-m\right) + \left(I\left(\vec{p} + \frac{n\vec{v}_i}{m+n}, t+n\right)\right)\right)$$

$$W(\vec{p}, t) = \sum_{\{B_i\}} 2w\left(\vec{p}, \vec{p}_i + \frac{n\vec{v}_i}{m+n}\right)$$

$$\tilde{I}(\vec{p}, t) = \begin{cases} I(\vec{p}, t) / W(\vec{p}, t) & \text{if } W(\vec{p}, t) \neq 0 \\ I(\vec{p}, t-1) & \text{if } W(\vec{p}, t) = 0 \end{cases}$$

where $\vec{v}_i$ is the movement of $B_i$ from frame $F_{t-m}$ to frame $F_{t+n}$, $\vec{P}$ is the coordinate of Bi, and $w(*,*)$ is the window function. $v_1=0$ when $B_i$ is INTRA-coded, $w(*,*)$ equals zero when $\vec{p}$ is outside the $B_i$. In order to reduce the block artifacts, the weighting value of $w(*,*)$ could be similar to the coefficients defined for overlapped block motion compensation (OBMC).

INTERLACED-TO-PROGRESSIVE SCAN CONVERSION

Figure 6:
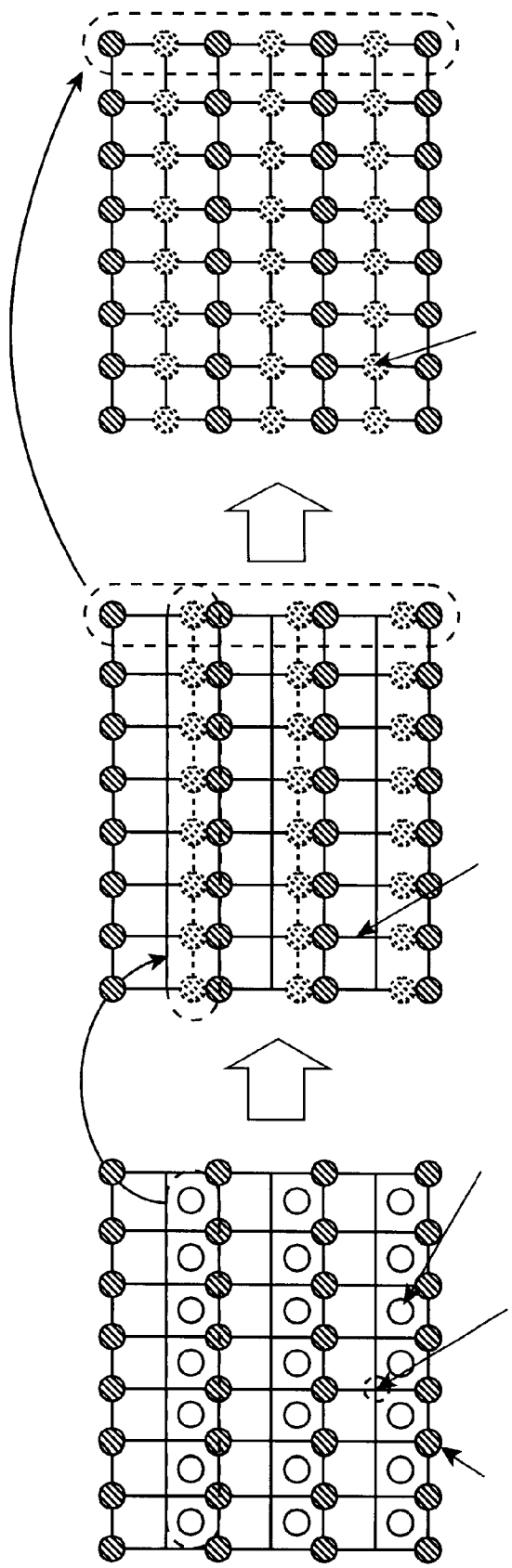
FIG. 6 is a schematic illustration of certain aspects of the use of a generalized sampling theorem in connection with motion-based de-interlacing according to the present invention.

As stated above, the present arrangement is particularly suited for use in connection with interlaced-to-progressive scan conversion (see FIGS. 6 and 7). The first step is to perform true motion-based compensation at the video decoder (See FIG. 3) and obtain a missing set of samples on the 2t plane, and the second step is to use these samples and the samples which exist for the preceding field to determine the samples for the missing field (See FIG. 6). Some issues regarding motion-based compensation are discussed first. Then, our use of the generalized sampling theorem is explained. Finally, a variety of different scenarios are considered so that the two steps can be put together to achieve a practical scan conversion scheme that yields a high quality output.

Prior methods are known which utilize a 3D recursive-search block matcher to estimate motion up to ¼ to ½ pixel accuracy. The present method provides even higher accuracy using its generalized sampling theorem. The high precision TMT vertically integrates two parts: (1) a matching-based TMT as the base, and (2) a gradient-based motion vector refinement. Gradient-based approaches are accurate at finding motion vectors less one pixel resolution.

Most previous methods use causal information (never use the next fields). They perform motion estimation based on the current field information. On the other hand, the present method uses non-causal information. The motion estimation is performed making use of the previous field and the next field. By assuming that the motion of a block is almost linear over a very small period of time, we can linearly interpolate the motion vectors related to the current field. In addition, because the information from previous and next fields is available, the non-grid pixels of the current field are bi-directionally interpolated for higher precision. Furthermore, previous or next odd fields are used for the motion estimation of the current odd field (See FIG. 7). Previous or next even fields are used for the motion estimation of the current even field. Odd fields are not used for even field motion estimation or vice versa. Thus, only similarly (odd or even) numbered fields are compared. Most pixels in the odd field will stay in the odd field (e.g., non-motion background, horizontal panning regions). Therefore, using previous or next odd fields for the motion estimation of the current odd field is adequate. Only when there is an odd-pixel vertical movement will a pixel in the odd field move to the even field. However, when there is an odd-pixel vertical movement, the lost information in the current odd field is also lost in the previous even field. In that case it is unnecessary to track the motion.

The present method adaptively combines line averaging and motion compensated deinterlacing techniques. Based on the position of the motion compensated, sampled point, different weightings are assigned to it. When the motion compensated, sampled point has the same position as a missed pixel (e.g. non-motion region), it has the highest reliability. On the other hand, when the motion compensated, sampled point has the same position as the existing pixel, it has the lowest reliability. In addition, the reliability of the motion vector also influences the reliability of the motion compensated, sampled point.

The first step of the deinterlacing approach is to perform motion-based compensation and obtain a missing set of samples on the 2t (even field) plane, as shown in FIG. 5. There are many approaches to obtain a missing set of samples $\{I(m+\Delta_x, 2n+\Delta_y, 2t)\}$ on the 2t plane, such as:

1. we can find $I(m+v_x, 2n+1+v_y, 2t) = I(m, 2n+1, 2t+1) = I(m+2v_x, 2n+1+2v_y, 2t-1)$ from the motion estimation between the preceding odd field (2t−1) and the following odd field (2t+1);

2. we can find I(m+$v_x$, 2n+$v_y$, 2t)=I(m, 2n,2t+2) from the motion estimation between even field (2t) and even field (2t+2);
3. we can find I(m+$v_x$, 2n+$v_y$, 2t)=I(m, 2n,2t-2) from the motion estimation between the even field (2t) and the preceding even field (2t-2).

Since $\Delta_x$ and $\Delta_y$ require high accuracy, the true motion tracking for this application requires higher accuracy and precision than the true motion tracking for compression purposes. Our high-precision true motion tracker vertically integrates two parts: (1) a matching-based true motion tracker as the base, and (2) a gradient-based motion vector refinement. Our matching-based true motion tracker which uses a neighborhood relaxation formulation is very dependable. However, the true motion tracker can only find full-pel motion vectors. That is, the precision of the estimated motion vectors cannot be smaller than an integer. On the other hand, the precision of the motion vectors estimated by gradient-based techniques can be very small. Therefore, gradient-based techniques should be exploited in high-precision motion estimation.

Once a new set of motion compensated samples has been found on the 2t plane, we must then use those samples to determine a set of samples which lie on the sampling grid for the missing field, as shown in FIG. 6. Even though this sampling and reconstruction problem is two-dimensional, it is assumed that the signal is separable. Therefore, if {I(m, 2n, 2t), I (m+$\Delta_x$, 2n+$\Delta_y$, 2t)} are given, it actually takes two steps to find {I(m,2n+1, 2t)}. That is, For Horizontal Interpolation: Given {I(m+$\Delta_x$,2n+$\Delta_y$,2t)} find {I(m,2n+$\Delta_y$,2t)}: Because there are enough horizontal samples at the Nyquist rate, $$\{I(x, 2y + \Delta_y, 2t) = \sum_m I(m + \Delta_x, 2y + \Delta_y, 2t)\operatorname{sinc}(x - m - \Delta_x) \quad (13)$$

For Vertical Interpolation: Given {I(m,2n,2t),I(m,2n+$\Delta_y$,2t)} find {I(m,2n+1,2t)}: Since 0<$\Delta_y$<2, the generalized sampling theorem is used as:

$$I^{(1)}(x,2y+1,2t)=I^{(l-1)}(x,2y+1,2t)+$$

$$\left\{ I(x, 2y + \Delta_y, 2t) - \sum_n I(x, 2n, 2t)\operatorname{sinc}(2y + \Delta_y - 2n) - \sum_n I^{(l-1)}(x, 2n + 1, 2t)\operatorname{sinc}(2y + \Delta_y - 2n - 1) \right\} \frac{1}{\operatorname{sinc}(\Delta_y - 1)} \quad (14)$$

The above method works well. However, there are two special cases which require further attention.

1. Object Occlusion and Reappearance: As mentioned before, whenever there is object occlusion and reappearance, this makes the motion estimation and the motion-based frame-rate up-conversion more difficult. In this motion-compensated deinterlacing problem, the motion vectors at the object occlusion and reappearance region are ignored and use the intra-field information (e.g. line-averaging techniques) are used.
2. Field Motion Singularity: Where an object is moving upward/downward at (2n+1) pixels per field. ($\Delta_y$=0), multiple fields do not provide more information than that from a single field. Therefore, the intra-field information (e.g. line-averaging techniques) should be used.

The present method can be summarized as follows:

$$\Delta(i, 2j+1) = \sum_x \sum_y \sum_{\{B_i\}} w(x, y, B_i)\delta(i, x + v_{xi})\delta(2j+1, y + v_{yi})$$

$$\{(I(x + 2v_{xi}, y + 2v_{yi}, 2t - 1) +$$

$$I(x + 2v_{xi}, y + 2v_{yi}, 2t + 1)/2 -$$

$$\sum_m \sum_n I(m, 2n, 2t)\operatorname{sinc}(x + v_{xi} - m)$$

$$\operatorname{sinc}(y + v_{yi} - 2n) - \sum_m \sum_n I^{(l)}(m, 2n + 1, 2t)$$

$$\operatorname{sinc}(x + v_{xi} - m)\operatorname{sinc}(y + v_{yi} - 2n - 1)\}$$

$$W(i, 2j+1) = \sum_x \sum_y \sum_{\{B_i\}} w(x, y, B_i)\delta(i, x + v_{xi}) \quad (15)$$

$$\delta(2j+1, y + v_{yi})\operatorname{sinc}(x + v_{xi} - i)$$

$$\operatorname{sinc}(y + v_{yi} - 2j - 1)$$

$$I^{(l+1)}(i, 2j+1, 2t) = I^{(l)}(i, 2j+1, 2t) +$$

$$\begin{cases} \Delta(i, 2j+1)/W(i, 2j+1) & \text{if } W(i, 2j+1) \neq 0 \\ 0 & \text{if } W(i, 2j+1) = 0 \end{cases}$$

where $2\vec{v}_i$ is the movement of $B_i$ from field $f_{2t-1}$ to field $f_{2t+1}$, $\delta$ (a,b)=1 when |a-b|<1 and $\delta$ (a,b)=0 otherwise, w(z,900) is the window function, and $I^{(0)}$ (i,2j+1, 2t) is from the line averaging using the field $f_2t$. That is, $$I^{(0)}(i, 2j+1, 2t) = \sum_n I(i, 2n, 2t)\operatorname{sinc}\left(\frac{2n - 2j - 1}{2}\right)$$

w(x,y,$B_i$)=0 whenever (x,y)$^T$ is outside the $B_i$. In order to reduce the block artifacts, the weighting value of w(z,900) could be similar to the coefficients defined for overlapped block motion compensation (OBMC).

Generalized Sampling Theorem

In the interlaced-to-progressive scan conversion method, a generalized sampling theorem is used. The Sampling Theorem itself is well-known as the following. If f(t) is a 1-D function having a Fourier transform F($\omega$) such that F($\omega$)=0 for |$\omega$|$\geq\omega_0$=$\pi/T_s$ (a band-limited signal), and is sampled at the points $t_n$=$nT_s$ (Nyquist rate), then f(t) can be reconstructed exactly from its samples {f($nT_s$)} as follows:

$$f(t) = \sum_{n=-\infty}^{\infty} f(nT_s)\frac{\sin[\omega_0(t - nT_s)]}{[\omega_0(t - nT_s)]} = \sum_{n=\infty}^{\infty} f(nT_s)\operatorname{sinc}\left(\frac{t - nT_s}{T_s}\right)$$

where sinc(0) = 1 and sinc(x) = ($\pi x$)/$\pi x$ whenever $x \neq 0$.

Since the original sampling theorem debut, it has been generalized into various extensions. One Generalized Sampling Theorem is the following. If f(t) is band-limited to $\omega_0$=$\pi/T_s$, and is sampled at ½ the Nyquist rate but, in each sampling interval, not one but two samples are used (bunched samples), then f(t) can be reconstructed exactly from its samples {f(2$nT_s$ +$\Delta T_k$)/0<$\Delta T_s$<2$T_s$, k=1,2}.

True Motion Information for Error Concealment

True motion vectors can also be used for better error concealment. Error concealment is intended to recover the loss due to channel noise (e.g., bit-errors in noisy channels, cell-loss in ATM networks) by utilizing available picture information. The error concealment techniques can be categorized into two it classes, according to the roles that the encoder and decoder play in the underlying approaches. Forward error concealment includes methods that add redundancy at the source (encoder) end to enhance error resilience of the coded bit streams. For example, I-picture motion vectors were introduced in MPEG-2 to improve error concealment. However, syntax changes are required. Error concealment by post-processing refers to operations at the decoder to recover damaged picture areas, based on characteristics of image and video signals.

The present method is a post-processing error concealment method that uses motion-based temporal interpolation for damaged image regions. This method uses true motion estimation at the encoder. In this work, the syntax is not changed and thus no additional bits are required. Using the true motion vectors for video coding can even optimize the bit rate for residual and motion information. Using true motion vectors for coding offers significant improvement in motion-compensated frame-rate up-conversion over the minimal-residue BMA. The more accurate the motion estimation, the better the performance of frame-rate up-conversion. Because the error concealment problem is similar to the frame-rate up-conversion problem when the error is the whole frame, one can also interpolate the damaged image regions more readily making use of the true motion vectors as described above.

While the foregoing invention has been described in terms of one or more preferred embodiments, it will be apparent to persons skilled in this art that various modifications may be made without departing from the scope of the invention, which is set forth in the following claims.

What is claimed is:

1. In an electronic image sequence reproduction system, wherein digitally encoded picture information is supplied, including true motion vector data associated with individual blocks of image information, a method of image data interpolation comprising:

decoding from said digitally encoded picture information said true motion vector data for said blocks of image information, with said true motion vector data being dependent in part on neighboring image block proximity weighting factors;

interpolating from supplied picture information, image sequence signal data corresponding to intermediate image time intervals absent from said supplied picture information, said absent image time intervals corresponding to intermediate image information occurring during said intermediate image time intervals in sequence between supplied image time intervals associated with said supplied picture information, said interpolating comprising the steps of constructing image pixels for image blocks in each said intermediate image time interval, based upon corresponding pixels in corresponding blocks in said supplied picture information occurring immediately before and after said intermediate image time interval, by distributing to constructed image pixels a fractional portion of image intensity difference information between said corresponding pixels occurring before and after said intermediate time to produce averaged intensity pixels for said intermediate image time interval;

associating with each constructed image pixel in each said intermediate time interval a corresponding true motion vector equal in magnitude to a fractional part of the true motion vector information associated with the block in which the corresponding pixel is located in a reference supplied time interval, said fractional part being determined according to the number of intermediate image time intervals inserted between supplied time intervals; and associating each said constructed averaged intensity pixel with a spatial location in said intermediate image time interval according to said fractional part of said corresponding decoded true motion vector.

2. The method of claim 1 wherein:

said neighboring block proximity weighting factors include, with respect to each block of image information, motion vector data associated with image blocks immediately adjacent to and further remote from said each image block, said true motion vector data being determined by summing motion vectors associated with said immediately adjacent and remote blocks, where said immediately adjacent parameters are weighed greater than said remote parameters in said summing.

3. The method of claim 2 wherein:

said absent intermediate image time intervals correspond to omitted pairs of even and odd fields of image information, each said pair comprising a frame of image information, and said steps of constructing and associating true motion vectors with said image pixels in absent even and odd fields comprises comparing odd field information only with odd field information and comparing even field information only with even field information to determine said portion of image intensity difference and part of time motion vector information to be associated with image pixels in said absent fields.

4. The method of claim 3 wherein:

said supplied image time intervals correspond to 1/Nth of successive time intervals in an electronic image sequence, where N is an integer greater than one, and said fractional portion of image intensity difference and said fractional part of true motion information is 1/Nth said difference and said information, respectively.

5. In an electronic digital image sequence reproduction system, wherein digitally encoded picture information in frame format is supplied, including true motion vector data associated with individual blocks of image information, which motion vector data is dependent upon proximity weighted displacement parameters of neighboring blocks, a method of frame rate up-conversion comprising:

decoding from said digitally encoded picture information said true motion vector data for each said block of image information in each transmitted frame, interpolating image sequence signal data corresponding to intermediate frames occurring in time sequence between transmitted frames spaced apart by a time interval T, said intermediate frames occurring at time intervals T/N, where N is a whole number greater than one, by constructing pixels for each said intermediate frame by averaging, with respect to each block in an intermediate frame, intensity information for corresponding pixels in each block in the transmitted frames adjacent in time to said intermediate frame, associating with each averaged intensity pixel in each said intermediate frame a corresponding true motion vector equal in magnitude to 1/Nth the magnitude of the true motion vector information associated with the corresponding block in which said pixel is located in an immediately succeeding transmitted frame, and associating each said averaged intensity pixel with a spatial location in said intermediate frame according to said corresponding decoded true motion vector.

6. The method of frame rate up-conversion according to claim 5 wherein:

said neighboring block proximity weighting factors include, with respect to each block of image information, motion vector data associated with image blocks immediately adjacent to and further remote from said each image block, said true motion vector data being determined by summing motion vectors associated with said immediately adjacent and remote blocks, where said immediately adjacent parameters are weighed greater than said remote parameters in said summing.

7. The method of frame rate up-conversion according to claim 6 wherein:

said absent intermediate image time intervals correspond to omitted pairs of even and odd fields of image information, each said pair comprising a frame of image information, and said steps of constructing and associating true motion vectors with said image pixels in absent even and odd fields comprises comparing odd field information only with odd field information and comparing even field information only with even field information to determine said portion of image intensity difference and part of time motion vector information to be associated with image pixels in said absent fields.

8. The method of frame rate up-conversion according to claim 7 wherein:

said supplied image time intervals correspond to 1/Nth of successive time intervals in an electronic image sequence, where N is an integer greater than one, and said fractional portion of image intensity difference and said fractional part of true motion information is 1/Nth said difference and said information, respectively.

9. The method of claim 1 wherein:

said absent intermediate image time intervals correspond to omitted pairs of odd numbered lines in an even numbered field of image information, said steps of constructing and associating true motion vectors with said image pixels in absent odd lines comprises comparing odd line information only with odd line information to determine said portion of image intensity difference and part of time motion vector information to be associated with image pixels in said absent lines.

10. The method of claim 9 wherein:

said neighboring block proximity weighting factors include, with respect to each block of image information, motion vector data associated with image blocks immediately adjacent to and further remote from said each image block, said true motion vector data being determined by summing motion vectors associated with said immediately adjacent and remote blocks, where said immediately adjacent parameters are weighed greater than said remote parameters in said summing.

11. The method of claim 1 wherein:

said absent intermediate image time intervals correspond to omitted pairs of even numbered lines in odd numbered field of image information, and said steps of constructing and associating true motion vector with said image pixels in absent even lines comprises comparing even line information only with even line information to determine said portion of image intensity difference and part of time motion vector information to be associated with image pixels in said absent lines.

12. The method of claim 11 wherein:

said neighboring block proximity weighting factors include, with respect to each block of image information, motion vector data associated with image blocks immediately adjacent to and further remote from said each image block, said true motion vector data being determined by summing motion vectors associated with said immediately adjacent and remote blocks, where said immediately adjacent parameters are weighed greater than said remote parameters in said summing.

13. The method of claim 12 and further comprising:

comparing said constructed image pixels for said absent lines with corresponding image pixels in said field of image information to determine a spatial position for said constructed image pixels.

14. In a digital image sequence reproduction system wherein image fields are made up of blocks of pixels, at least some of which pixels are spatially displaced in one field compared to spatial positions of corresponding pixels in a successive field, a method of determining true motion vector data associated with feature blocks comprising:

selecting, from among all of the blocks of pixels in a field, candidate feature blocks having intensity variance between pixels in said blocks above a threshold which indicates the presence of prominent texture features, comparing candidate feature blocks with blocks in similarly numbered adjacent field intervals to determine sets of displaced frame difference (DFD) residue parameters for each said candidate feature block, comparing said sets of DFD residue parameters of said candidate blocks against a lower residue threshold and an upper residue limit, identifying unconditionally acceptable motion vectors for said candidate feature blocks as those motion vectors corresponding to instances where said DFD parameters are less than said lower threshold, determining rejected motion vectors for said candidate feature blocks as those corresponding to instances where said DFD parameters are greater than said upper limit, and determining conditionally acceptable motion vectors for said candidate feature blocks as those corresponding to instances where said DFD parameters are between said threshold and said upper limit, determining a global motion trend of a neighborhood around each said candidate feature block for which acceptable or conditionally acceptable motion vectors have been determined by applying each of said acceptable and conditionally acceptable motion vectors to the corresponding candidate feature block and its neighboring blocks in a predetermined spatial neighborhood of each of said candidate feature blocks, calculating, for each of said acceptable and conditionally acceptable motion vectors, a weighted score of a sum of residues for said corresponding candidate feature block and its neighboring blocks in said neighborhood of said candidate feature block, and selecting, as the true motion vector for each candidate feature block, the motion vector corresponding to a minimum weighted score.

* * * * *